US005685078A

United States Patent [19]

Obst et al.

[11] Patent Number: 5,685,078

[45] Date of Patent: Nov. 11, 1997

[54] INTERNAL PIPE CUTTER

[75] Inventors: Norman Obst; Dean Gray, both of Drayton Valley, Canada

[73] Assignees: Dean Gray Enterprises; Option Machine & Repair Ltd., Drayton Valley, both of Canada

[21] Appl. No.: 623,575

[22] Filed: Mar. 28, 1996

[30] Foreign Application Priority Data

Mar. 11, 1995 [CA] Canada .................................. 2161996

[51] Int. Cl.$^6$ .................................. B23D 21/06

[52] U.S. Cl. .................................. 30/107; 30/106

[58] Field of Search .................................. 30/107, 106, 105, 30/103

[56] References Cited

U.S. PATENT DOCUMENTS

| | | | |
|---|---|---|---|
| 442,125 | 12/1890 | Levasseur | 30/107 |
| 531,662 | 1/1895 | Thieme | 30/107 |
| 914,088 | 3/1909 | Thornton | 30/107 |
| 943,323 | 12/1909 | Sorensen | 30/107 |
| 2,695,449 | 11/1954 | Chauvin . | |
| 2,731,718 | 1/1956 | Goss . | |
| 3,883,950 | 5/1975 | Kurtz . | |
| 3,939,561 | 2/1976 | Nichols . | |

FOREIGN PATENT DOCUMENTS

| | | |
|---|---|---|
| 94719 | 12/1901 | Canada . |
| 241020 | 10/1923 | Canada . |
| 302053 | 1/1926 | Canada . |
| 1168573 | 6/1984 | Canada . |

*Primary Examiner*—Hwei-Siu Payer

*Attorney, Agent, or Firm*—Jones, Tullar & Cooper, P.C.

[57] ABSTRACT

A device for cutting pipe internally includes an annular cutter head having a plurality of circumferentially spaced openings therethrough, a stepped drive shaft extending from the cutter head and having a longitudinal bore therethrough and an adapter at the distal end of the drive shaft for connection to a rotary drive member. A frustoconical mandrel has a threaded rod extending from one end thereof through the shaft bore to the distal end of the shaft where it threadably engages a nut held stationary with respect to the drive shaft. The mandrel has a plurality of inverted T-shaped slots extending along the frustoconical side thereof, each slot receiving the T-shaped projection on a cutter body. Each cutter body has a rotatable cutter wheel mounted thereon, the wheel being adapted to project through a corresponding opening in the cutter head. Rotation of the drive shaft by the rotary drive member will cause rotation of the mandrel and the threaded rod. The relative movement between the threaded rod and the nut causes the rod to move through the nut so as to draw the mandrel into the cutter head. Due to the sloping nature of the mandrel wall and the interengagement between the T-shaped slots and projections the cutter bodies and the cutter wheels will be moved progressively radially outwards of the cutter head during rotation of the drive shaft so that the cutter wheels can cut into the internal wall of the pipe at a controlled progressive rate.

9 Claims, 6 Drawing Sheets

FIG. 9
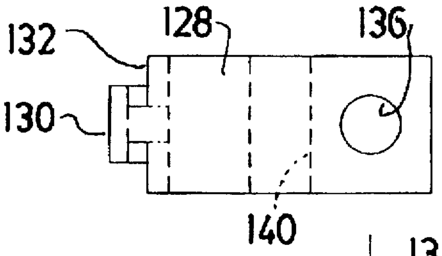
FIG. 13
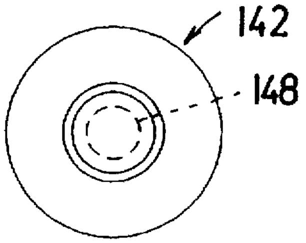
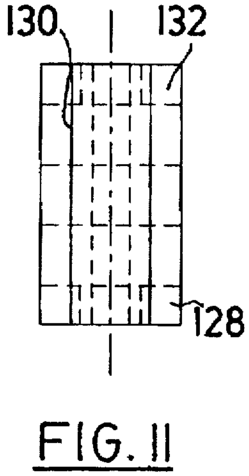
FIG. 11
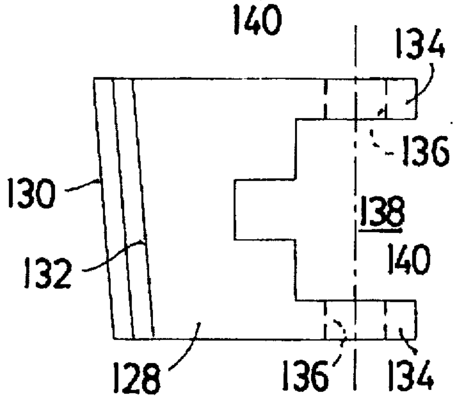
FIG. 10
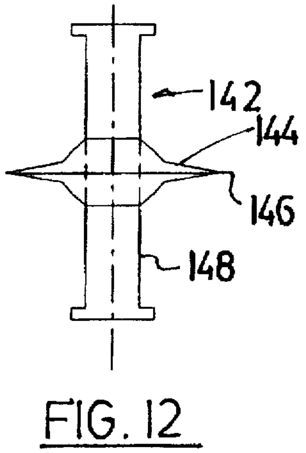
FIG. 12

INTERNAL PIPE CUTTER

The present invention relates generally to pipe cutters and more particularly to a device for cutting pipe or other cylindrical objects internally thereof.

BACKGROUND OF THE INVENTION

There are many devices available for cutting pipe or other cylindrical objects at a particular point along the length thereof. Most such devices cut the pipe from the outer wall surface in to the inner wall surface. However, there are instances where it is not possible to cut the pipe externally, such as when the pipe is buried in the earth, as in the case of well casing that extends vertically into the ground. If such pipe has to be cut it is necessary to effect the cut from the inside of the pipe to the outside.

There have been a number of attempts at devising an internal pipe cutter that is effective and safe to use. Internal pipe cutters are found for example in U.S. Pat. Nos. 2,695,449; 2,731,718; 3,883,950 and 3,939,561 as well as in Canadian Patents Nos. 73,443; 241,020; 256,988 and 1,168,573. All of the internal pipe cutters of these patents use rotary cutter wheels mounted in radially movable members, means for guiding the wheel-carrying members during their radial movement, and a wedge-like member for moving the wheel-carrying members radially relative to the cutter. In some cases the wedge member is movable upwardly to effect the radial movement and in others it is movable downwardly.

SUMMARY OF THE INVENTION

One problem associated with the prior art internal pipe cutters is that of a constant feed rate for the cutter members so that a uniform cut is created. The internal pipe cutter of the present invention overcomes that problem by providing for continuous, automatic radial feed of the cutter members with each revolution of the cutter head of the device. A predetermined optimum feed rate for the particular situation can be utilized by preselecting the components that are assembled into the device of the invention. The present invention also utilizes components that are not adversely affected by debris and grit and they are relatively easy and inexpensive to manufacture.

Generally speaking the present invention may be considered as providing a device for cutting pipe internally comprising: a generally annular cutter head having a plurality of circumferentually spaced openings in a side wall thereof; a cylindrical drive shaft connected to the cutter head and extending axially away therefrom; means for connecting a distal end of the drive shaft to rotary drive means; a plurality of individual cutter assemblies contained within the cutter head, each cutter assembly including a cutter body and cutter means attached to the cutter body, the cutter means being adapted to project from a corresponding opening in the cutter head when the cutter assemblies are located in the cutter head; a frustoconical mandrel member axially slidably received within the cutter head and including a plurality of circumferentially spaced inverted T-shaped guide slots extending along the frustoconical side wall thereof, each slot being adapted for reception of a mating T-shaped projection on a corresponding cutter body; an elongated threaded rod extending from the small diameter end of the mandrel member to adjacent the connecting means; a threaded nut engageable with the threaded rod and positioned at the distal end thereof adjacent the connecting means; and means for holding the nut stationary during rotation of the drive shaft; whereby, with the cutter head positioned within a pipe so that the cutter means are at a predetermined location therein, and the cutter means engaging the internal wall of said pipe, rotation of the drive shaft will cause the cutter means to begin cutting the pipe at the location and will also cause the threaded rod to threadably move through the nut and thereby move the mandrel member axially of the cutter head, such movement of the mandrel member causing the cutter bodies and the attached cutter means to project further radially outwardly of the cutter head and to progressively cut the pipe at a predetermined controlled rate.

BRIEF DESCRIPTION OF THE DRAWINGS

FIGS. 9, 10 and 11 show top, side and left end views respectively of the cutter body used with this invention.

FIGS. 12 and 13 show side and top views respectively of the cutter wheel assembly used with this invention.

DESCRIPTION OF THE PREFERRED EMBODIMENT

Figure 1:
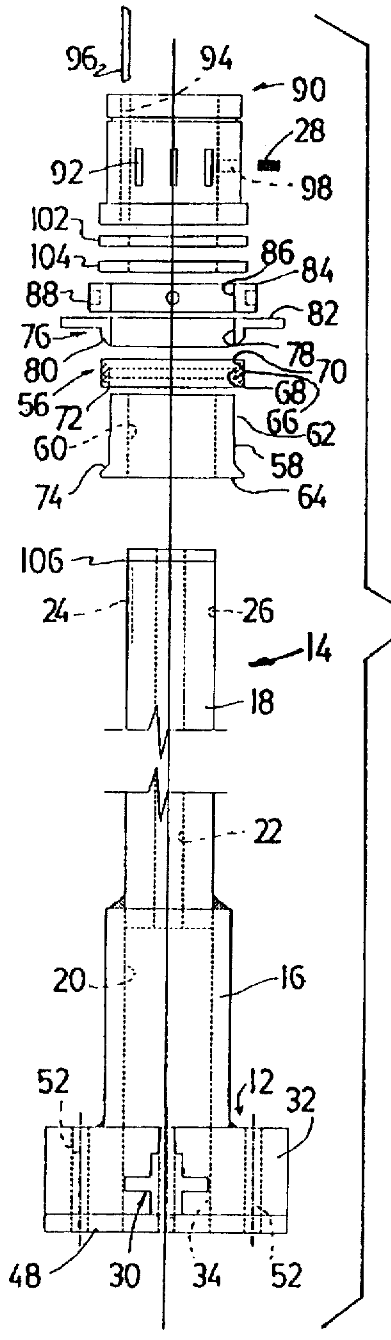
FIG. 1 is a longitudinally exploded view of the major external components of the internal pipe cutter of this invention.
Figure 2:
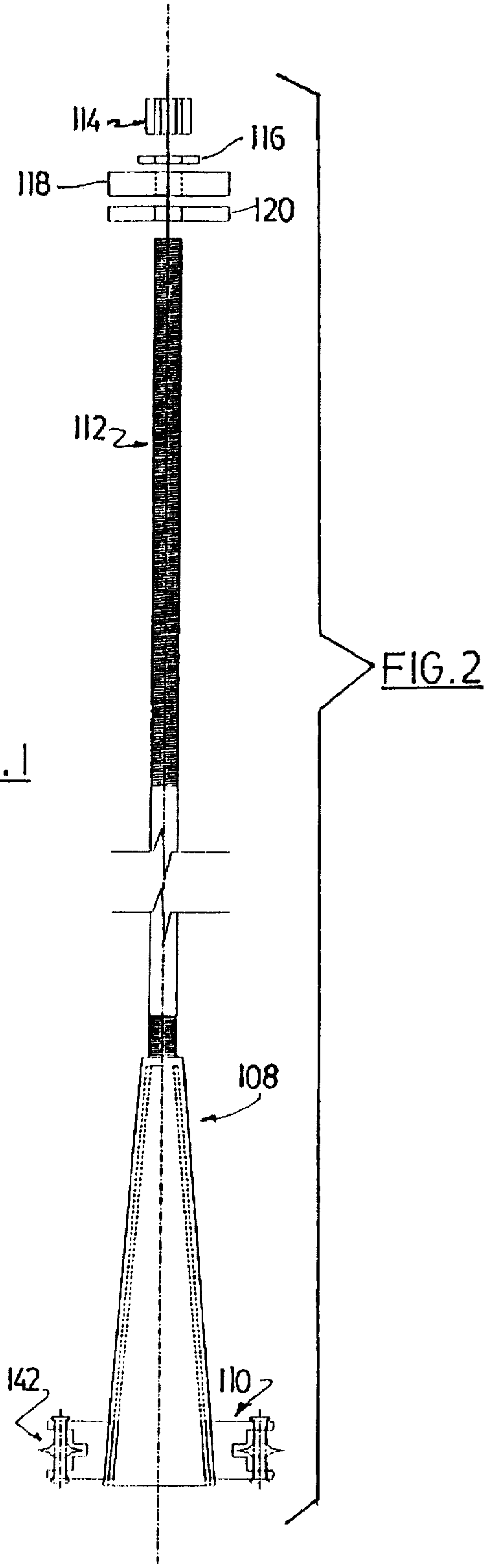
FIG. 2 is a longitudinally exploded view of the major internal components of the present invention.
Figure 4:
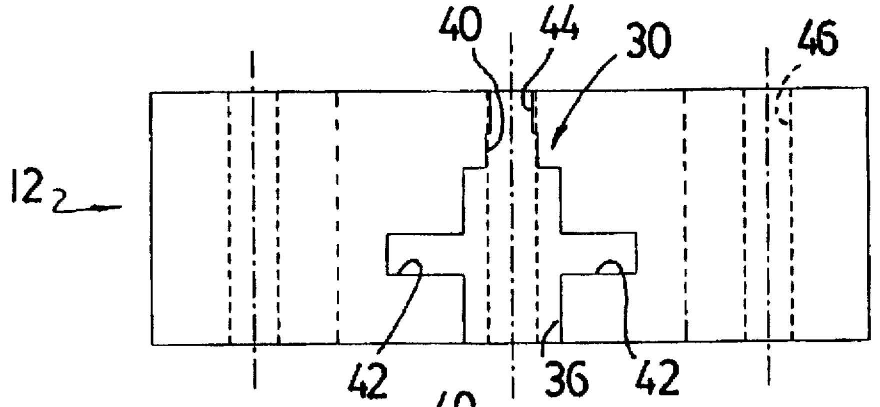
FIGS. 3 and 4 show bottom and side views respectively of the cutter head as used with this invention.

The major components of the internal pipe cutter of this invention are presented in FIGS. 1 and 2. The externally apparent components are seen primarily in FIG. 1 while the components found primarily internally of the cutter are seen in FIG. 2. Some of these components are described in further detail with reference to these figures and the other figures of the drawings, including the assembly view of FIG. 14.

The pipe cutter of this invention includes a generally annular cutter head 12 to which is welded an elongated cylindrical drive shaft 14, the shaft being formed of two parts, a relatively short lower part 16 and a relatively long upper part 18 of smaller external diameter. The lower shaft part 16 has a large diameter internal bore 20 while the upper shaft part has a small diameter internal bore 22 along the entire length thereof. At its upper or distal end the upper shaft part 18 has a narrow rectangular key slot 24 cut into the outer surface thereof and, opposite to the key slot, a circular recess 26 to receive a set screw 28 as described hereinafter.

Figure 3:
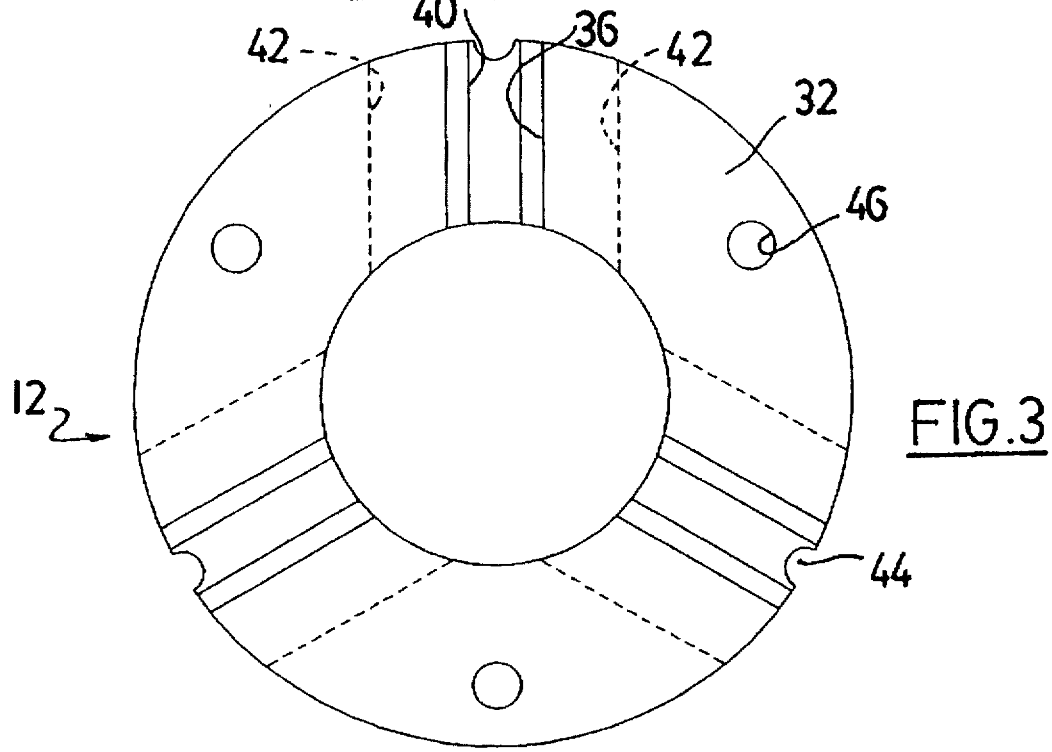

As indicated above, the cutter head 12 is annular and is welded to the lower end of the lower shaft part 16. The cutter head has a plurality of circumferentially spaced openings 30 extending radially through the side wall 32 from the exterior to the internal bore 34, which bore is an extension of the bore 20 in the shaft lower part 16. With reference to FIG. 3 it will be seen that each opening 30 includes a radial slot 36 which extends into the side wall 32 from the bottom surface 48, a narrower slot 40 extending upwardly from the top of the slot 36, and a pair of side slots 42 within the side wall of the cutter head which extend laterally from the slot 36 and which also extend radially of the cutter head 12. At the outer surface of the cutter head there is a longitudinally extending semi-circular groove 44 along the vertical length of the front edge of the narrow slot 40. Equiangularly spaced between adjacent pairs of openings 30 is plurality of longitudinally extending threaded bores 46.

Figure 5:
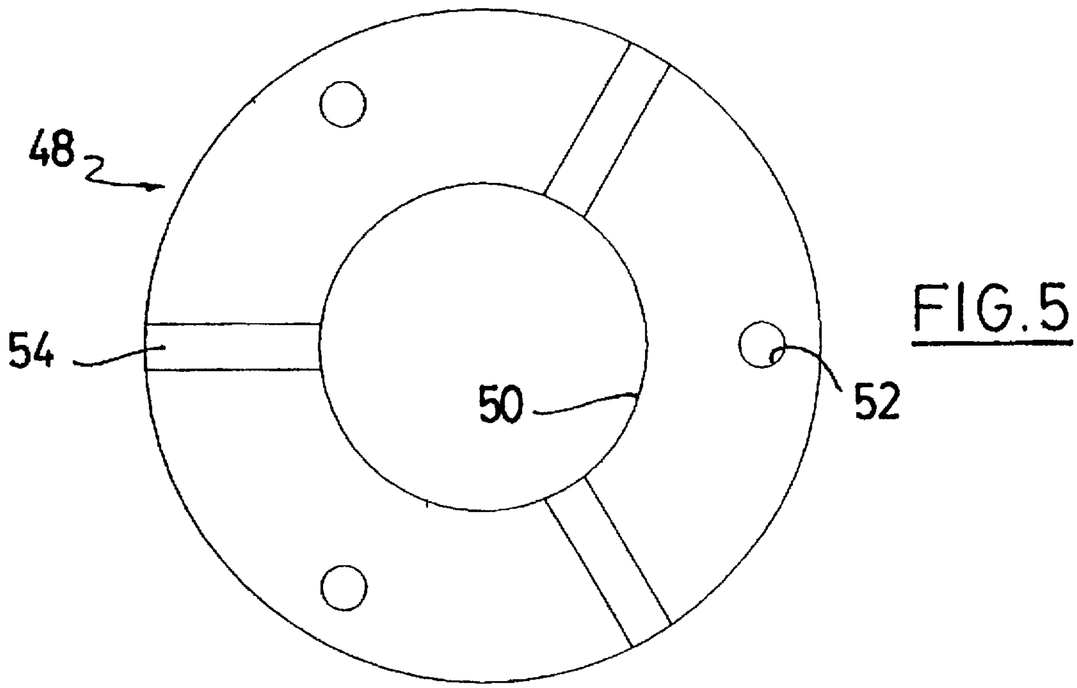
FIGS. 5 and 6 show plan and side views respectively of a cutter head retainer disc used with this invention.
Figure 6:
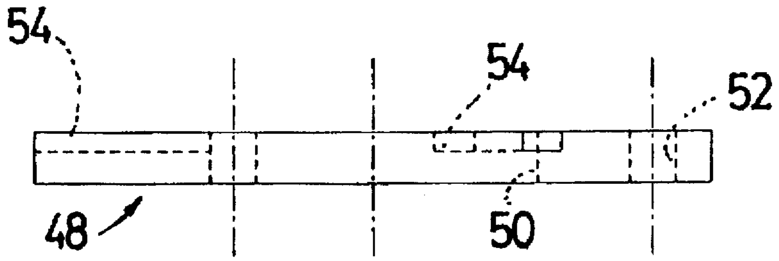

As seen in FIGS. 1, 5 and 6 an annular cutter head retainer disc 48 is provided, having a central bore 50 of the same diameter as the bores 20 and 34, a plurality of equally spaced through bores 52 and a plurality of equally spaced, radially extending rectangular grooves 54. The disc is assembled to the bottom of the cutter head with the grooves 54 aligned with the slots 36 and the bores 52 aligned with the bores 46. The disc 48 can be assembled and secured to the cutter head 16 by threaded bolts or machine screws (not shown) which extend through the bores 52 and are threadably received in the bores 46.

A number of components are provided at the top of the shaft 14 to facilitate operation of the cutter of this invention. Specifically, a centralizing hub assembly 56 includes a collar member 58 having an internal through bore 60 of a diameter to receive the upper end of the upper shaft part 18, an externally threaded portion 62 at the upper end thereof, and an outwardly flaring flange portion 64 adjacent the bottom edge thereof. A relatively thin cylindrical nylon expansion disc 66 has an inner diameter 68 sized to receive the outer wall of the collar member 58 as well as bevelled upper and lower walls 70, 72. The bevelled lower wall 72 is adapted to mate with the bevelled upper surface 74 of the flange 64. A second cylindrical collar member 76 has an inner diameter 78 sized to receive the outer wall of the collar member 58, a bevelled lower edge 80 adapted for a mating fit with the bevelled upper wall 70 of the expansion disc 66, and an outwardly extending circumferential flange 82. A retainer member 84 has an internally threaded bore 86 and a plurality of circumferentially spaced threaded radial bores 88 each adapted to receive a threaded set screw (not shown).

The upper portion of the assembly of FIG. 1 includes a cylindrical adapter member 90 intended to connect the shaft 14 to a portable power drive unit, such as a RIGID® Model 700 Portable Power Drive available from The Rigid Tool company of Elyria, Ohio, U.S.A. The adapter member includes external grooves 92 for mating engagement with drive portions of the drive unit, an internal longitudinally extending keyway 94 to receive a key 96 which is also engageable with the keyway 24 in the shaft part 18, and a threaded bore 98 for reception of the set screw 28 receivable in the recess 26 in the shaft part 18.

Below the adapter member 90 there are two washer members or discs, 102 and 104. The upper disc 102 is metallic and the lower disc 104 is formed of a resilient material such as rubber to provide a cushioning effect during operation of the cutter of this invention.

A circumferential groove 106 at the upper end of the upper shaft part 18 is intended to receive a circlip or snap ring 107 (FIG. 14) to provide an upper stop against which the upper edge of the retainer member can abut during operation of the device of this invention.

Turning now to FIG. 2 and FIGS. 7 to 13, the internal components of the present invention will be described. With particular reference to FIG. 2 there is seen a frustoconical or tapered mandrel member 108, a plurality of cutter assemblies 110, a longitudinally extending threaded rod member 112, a nut member 114 and a plurality of washer or disc members 116, 118 and 120. These components will be described in greater detail with reference to FIGS. 7 to 13.

Figure 8:
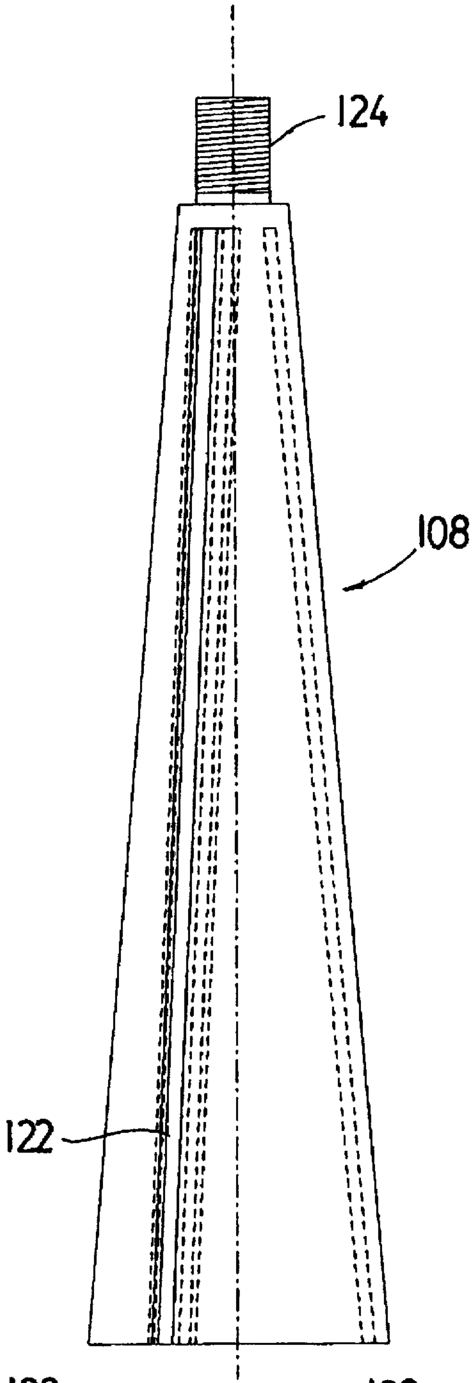
FIGS. 7 and 8 show end and side view respectively of the tapered mandrel used with this invention.
Figure 7:
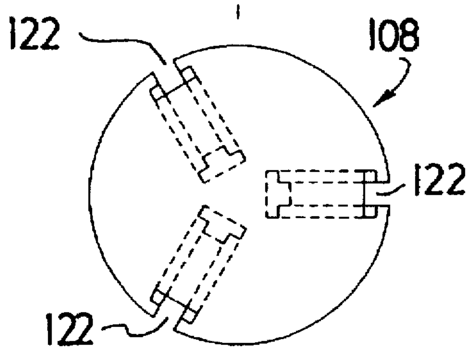

FIGS. 7 and 8 show the mandrel member 108 as a frustoconical or upwardly tapering member of circular cross-section. Extending upwardly from the bottom surface is a plurality of inverted T-shaped guide slots 122 each of which opens to the outer surface of the mandrel. The slots stop short of the top of the mandrel and at the top end thereof there is an upwardly projecting threaded extension 124. The extension 124 may extend completely to the upper distal end of the cutter as shown in FIG. 2, as the threaded rod member 112. Alternatively, an intermediate rod member (not shown), suitably threaded at both ends thereof, may be threadably connected to the extension 124 to create the same effect as the one-piece threaded rod member 112 seen in FIG. 2.

FIGS. 9 to 13 illustrate the elements of the preferred cutter assemblies used with this invention. Each assembly includes a cutter body 128 which is generally rectangular in plan with a T-shaped projection or flange 130 extending along the angled rear wall 132. The front of the cutter body includes upper and lower lugs 134 each of which has a circular through hole 136 aligned with the other such hole. A rectangular space 138 appears between the lugs 134, 134 and a recess 140 opens rearwardly into the cutter body.

Figure 14:
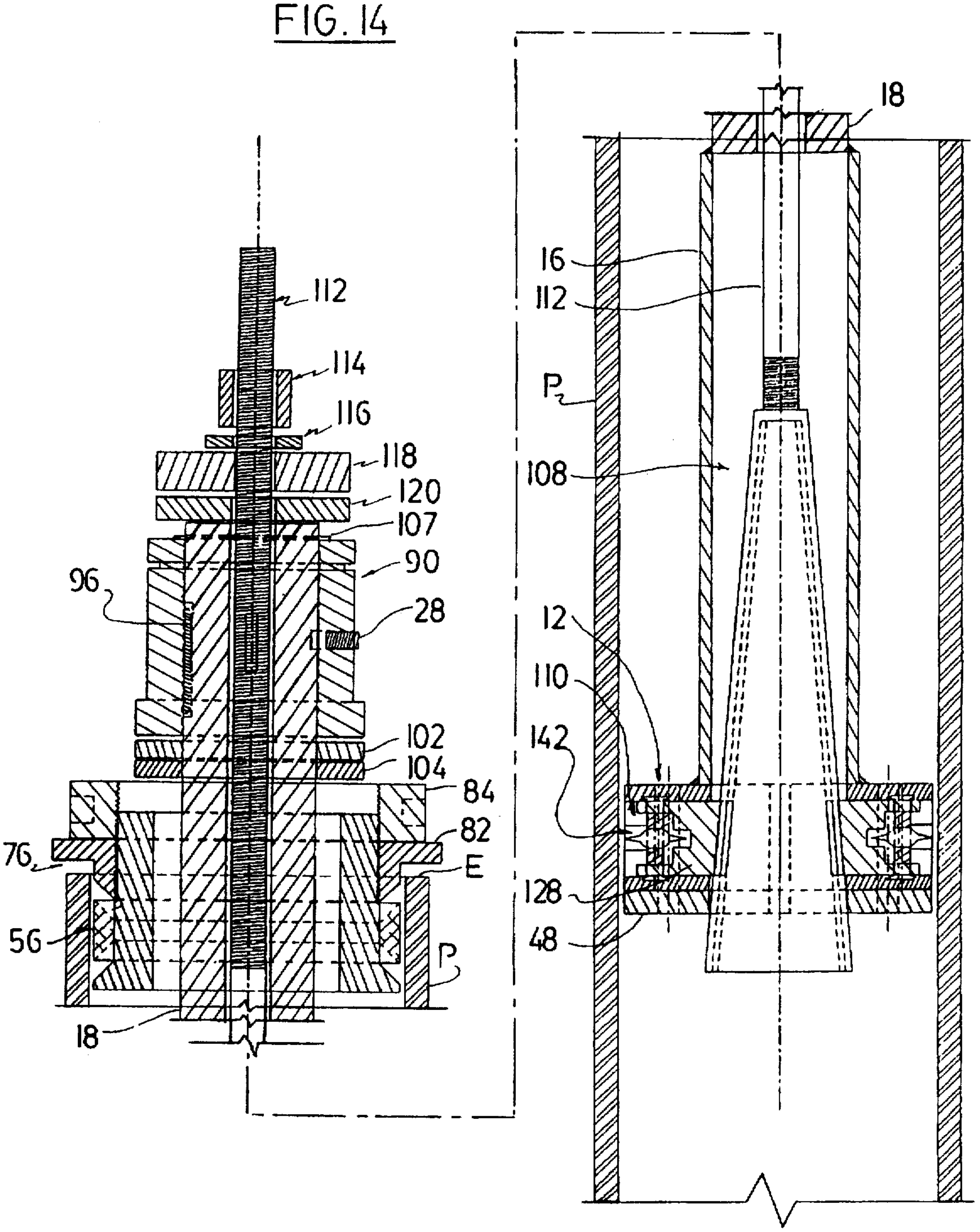
FIG. 14 shows in partial cross-section an assembly view of the apparatus of this invention.

A cutter wheel 142 having a radially tapering circumferentially extending cutting portion 144 ending at a sharp edge 146 is mounted to a rotatable shaft member 148 which in turn is received in a conventional manner in the holes 136, which holes operate as journals for the shaft member 148. In the assembly as seen in FIGS. 2 and 14 the cutter wheel 142 has a portion extending outwardly beyond the cutter body while the opposite portion is located within the clearance recess 140.

As seen in FIG. 7 and 9 the T-shaped flange 130 of each cutter body is slidably receivable in a corresponding inverted T-shaped guide slot 122 in the mandrel member 108. Each cutter body, with the shaft member 148 and cutter wheel 142 mounted therein is free to move along the mandrel member 108 constrained by the interaction between the flange 130 and the guide slot 122.

At the top or distal end of the threaded rod 112 there is a brass feed nut 114 which is threadably receivable on the threaded rod 112. Below the nut is a small diameter washer 116, a larger diameter and thicker washer 118 and a resilient washer or disc 120.

The operation of the cutter of this invention involves first of all determining the position or location of the cut to be made in the pipe and then selecting appropriate lengths of shaft part 18 and rod 112 to accommodate the desired cut. Furthermore, the internal diameter of the pipe and the wall thickness thereof must be determined so that a cutter head of the required diameter and cutter wheels of the required size can be selected. Once the required components have been selected from a stock of differently sized components it is necessary to assemble those components into the cutter to be used.

The assembly process involves first of all engaging the T-shaped flange 130 of each cutter body 128 with a respective T-shaped guide slot 122 in the mandrel member 108 and sliding those bodies to the upper end of the mandrel member so that the cutter bodies are fully retracted relative to the mandrel member. The mandrel member with cutter bodies 128 attached is then slid into the cutter head 12 from the bottom so that the threaded rod 112 extends upwardly through the bores 20 and 22 of the shaft 14. The cutter bodies are aligned with the openings 30 so that in use the cutter wheels will be at the level of the slots 42. The retainer disc 48 is attached to the bottom of the cutter head 12 to prevent inadvertent disengagement of the cutter bodies 128 from the cutter head 12. Because of the through bore 50 in the retainer disc 48 the mandrel member 108 can extend through the bore 50 as well as the bore 34 of the cutter head 12.

At the upper end of the cutter the components of the centralising hub assembly 56 are assembled together and are slid over the distal end of the shaft 14. Then, the discs 102, 104 are slid over the shaft 14 to rest on the upper edge of the retainer member 84 and the adapter member 90 is positioned on the distal end of the shaft 14 with the key 96 engaging the keyways 24 and 94 and the set screw 28 threaded through the bore 98 into the recess 26, all to fix or secure the adapter member 90 to the shaft 14.

The distal end of the threaded rod 112 projects through the upper end of the shaft 14 and the resilient disc 120 and the washers 118 and 116 are positioned over the projecting end of the rod. The nut 114 is then threaded onto the distal end of the rod 112 and is threaded down to rest against the washer 116. The resilient washer 120 will be resting on the upper end wall of the shaft 14 and the nut 114 will project above the upper end wall of the adapter member 90.

The assembled cutter of this invention may now be inserted into the pipe to be cut until the flange 82 of the centralising hub assembly 56 rests on the upper end E of the pipe P (FIG. 14) or an appropriate datum. When this occurs the cutter wheels should be at the predetermined position within the pipe at which the cut is to be made. The nut 114 is then rotated so that the mandrel member 108 is drawn upwardly by the threaded rod 112, causing the interaction between the T-shaped guide slots 122 and the T-shaped flange 130 to push the cutter bodies radially outwards of the cutter head and to cause the cutter wheels to project from the openings 30 of the cutter head. The mandrel member 108 is moved upwardly via the relative threaded movement between the nut 114 and the rod 112 until the cutter wheels touch the inner wall of the pipe. The engagement between the cutter wheels and the inner wall of the pipe can be easily detected due to the increased resistance to rotation of the nut 114.

The portable power drive unit is then connected to the adapter 90 and a back-up wrench is applied to the nut 114 to tension the rod 112. The wrench is attached to the power drive unit to prevent relative rotation between the power drive unit and the nut 114. A back-up bar or bracket is bolted to the power drive unit and to the surrounding structure, such as a wellhead, in order to anchor the power drive unit and to keep it from turning relative to the pipe.

The power drive unit is then activated so as to start rotating the drive shaft 14 and the drive head 12. Such rotation also causes rotation of the mandrel member 108 and the cutter assemblies 110, causing in turn the cutter wheels 142 to start cutting the pipe from the inside wall towards the outside wall thereof. As the mandrel member rotates, so will the threaded rod 112 and, since the nut 114 is stationary relative thereto, the rod will be forced to move upwardly relative to the nut. The upwards movement of the rod 112 means that the mandrel member also will move upwardly relative to the cutter head 12 into the bore 20 in the shaft part 16. Since the cutter assemblies 110 are constrained against upwards or downwards movement relative to the cutter head by their engagement with the openings 30 the upwards movement of the mandrel member will push the cutter assemblies and the cutter wheels carried thereby radially outwardly because of the inclined interengagement between the T-shaped guide slots 122 and the T-shaped flanges 130. The rate of radially outwards movement of the cutter wheels is determined by the taper angle of the mandrel 108, the pitch of the threads on the rod 112 and nut 114, and by the speed at which the drive shaft is rotatably driven by the power drive unit.

Once the pipe has been cut through, the power drive is reversed so as to move the mandrel member downwardly relative to the cutter head and thereby retract the cutter wheels back into the cutter head so that the entire cutter assembly can be withdrawn from the cut pipe.

The two resilient discs or washers 104 and 120 improve the operation of the cutter of this invention. Disc 104 for example allows variation in the vertical position of the cutter head 12. During the cutting of a vertical pipe or casing under tension the pipe may stretch at the cut as the depth of the cut increases, thereby weakening the pipe wall. This may have the effect of actually pulling the cutter downwardly and breaking a cutter wheel or its mounting shaft. The resilient disc 104 allows the cutters to pull down with the cut and to centralize themselves as necessary, preventing possible breakage. The resilient disc 120 cushions the direct outward movement of the cutter wheels, allowing the constant feedrate to be somewhat forgiving should cutter pressure become excessive.

The foregoing has described the preferred embodiment of the present invention but it is understood that skilled workmen in the field of pipe cutting could effect changes to the structure of the invention without departing from the spirit thereof. For example, the rotatable cutter wheels could be replaced by solid, non-rotatable cutting knives replacably attached to the cutter body or carrier and able to project out through a suitable opening in the cutter head as the cutter body is moved radially outwardly of the cutter head during the cutting operation. Thus, the protection to be afforded this invention is to be determined from the scope of the claims appended hereto.

We claim:

1. A device for cutting pipe internally comprising:

a generally annular cutter head having a plurality of circumferentually spaced openings in a side wall thereof, each opening including a radial slot extending through said side wall and a pair of radially and laterally extending side slots extending from said radial slot;

a cylindrical drive shaft connected to said cutter head and extending axially away therefrom, said drive shaft including a first shaft part connected to said cutter head and having a large diameter internal bore, and a second shaft part connected to said first shaft part and having a small diameter internal bore extending the length thereof;

an adapter member for connecting a distal end of said second drive shaft part to rotary drive means;

a plurality of individual cutter assemblies contained within said cutter head, each said cutter assembly including a cutter body and a cutter wheel secured to a shaft member rotatably journaled in said cutter body, said cutter wheel being receivable within the side slots of and adapted to project from a corresponding said opening in said cutter head when said cutter assemblies are located in said cutter head;

a frustoconical mandrel member axially slidably received within said cutter head and including a plurality of circumferentially spaced inverted T-shaped guide slots extending along the frustoconical side wall thereof, each said guide slot being adapted for reception of a mating T-shaped projection on an angled rear wall of a corresponding said cutter body;

an elongated threaded rod extending from the small diameter end of said mandrel member to adjacent said adapter member;

a threaded nut engageable with said threaded rod and positioned at the distal end thereof adjacent said adapter member; and means for holding said nut stationary during rotation of said drive shaft;

whereby, with said cutter head positioned within a pipe so that said cutter wheels are at a predetermined location therein, and said cutter wheels engaging the internal wall of said pipe, rotation of said drive shaft will cause said cutter wheels to begin cutting said pipe at said location and will also cause said threaded rod to threadably move through said nut and thereby move said mandrel member axially of said cutter head, such movement of said mandrel member causing said cutter bodies and the attached cutter wheels to project further radially outwardly of said cutter head and to progressively cut said pipe at a predetermined controlled rate.

2. A device for pipe internally comprising:

a generally annular cutter head having a plurality of circumferentually spaced openings in a side wall thereof;

a cylindrical drive shaft connected to said cutter head and extending axially away therefrom;

means for connecting a distal end of said drive shaft to rotary drive means;

a plurality of individual cutter assemblies contained within said cutter head, each said cutter assembly including a cutter body and cutter means attached to said cutter body, said cutter means being adapted to project from a corresponding said opening in said cutter head;

a frustoconical mandrel member axially slidably received within said cutter head and including a plurality of circumferentially spaced inverted T-shaped guide slots extending along the frustoconical side wall thereof each said slot being adapted for reception of a mating T-shaped project on a corresponding said cutter body;

an elongated threaded rod extending from the small diameter end of said mandrel member to adjacent said connecting means;

a threaded nut engageable with said threaded rod and position at the distal end thereof adjacent said connecting means; and means for holding said nut stationary during rotation of said drive shaft;

whereby, with said cutter head positioned within a pipe so that said cutter means are at a predetermined location therein, and said cutter means engaging the internal wall of said pipe, rotation of said drive shaft will cause said cutter means to begin cutting said pipe at said location and will also cause said threaded rod to threadably move through said nut and thereby move said mandrel member axially of said cutter head, such movement of said mandrel member causing said cutter bodies and the attached cutter means to project further radially outwardly of said cutter head and to progressively cut said pipe at a predetermined controlled rate.

3. The device of claim 2 wherein said drive shaft includes a first shaft part affixed to said cutter head and a smaller diameter second shaft part extending from said first shaft part to said distal end of said drive shaft, said first shaft part having a large diameter bore therein, said second shaft part having a small diameter bore therein whereby said large diameter bore is adapted to receive said mandrel member therein and said small diameter bore is adapted to receive said elongated rod therein.

4. The device of claim 3 including a centralizing hub assembly at said distal end of said drive shaft, said centralizing hub assembly including: a first annular collar member adapted to receive said second shaft part therein; an annular resilient expansion disc receivable on an outer wall of said first collar member; a second collar member receivable on said first collar member and engageable with said rersilient disc, said second collar member having a radially outwardly extending annular flange thereon; and a threaded annular retainer member receivable on said second shaft part and threadably engageable with said first collar member to clamp said first collar member, said resilient disc and said second collar member together.

5. The device of claim 4 wherein said connecting means includes an adapter member dimensioned for mating connecting to said rotary drive means, said adapter member also including: an internal keyway for receiving a key, which key is also receivable in a corresponding external keyway in said second shaft part at the distal end thereof; and a radially extending threaded bore opposite said internal keyway for receiving a threaded set screw, which set screw is also receivable in a corresponding recess in said second shaft part.

6. The device of claim 5 including a first resilient washer member located between a bottom surface of said adapter member and an upper surface of said threaded annular retainer member and a second resilient washer member located between said nut and an upper surface of said adapter member.

7. The device of claim 2 wherein each said opening in said cutter head includes: a radial slot extending into said cutter head from a bottom wall thereof, said slot being sized to receive one of said cutter bodies therein; a narrower radially extending slot extending upwardly from said radial slot; and a pair of radially extending side slots which also extend laterally from opposite sides of said radial slot.

8. The device of claim 7 including an annular retainer disc secured to the bottom wall of said cutter head.

9. The device of claim 8 wherein each of said cutter bodies includes: an angled rear wall having said T-shaped projecting thereon; a pair of vertically spaced lugs projecting from a front wall thereof; a vertically extending shaft member journaled in said lugs for rotation relative to said body; and an annular cutting wheel mounted to said shaft member, said cutting wheel being receivable within a space defined by said laterally extending slots of a corresponding said opening in said cutter head.

* * * * *